United States Patent
Livshitz et al.

(10) Patent No.: US 9,105,276 B2
(45) Date of Patent: Aug. 11, 2015

(54) SYSTEM AND METHOD FOR PROVIDING CONTROLLABLE STEADY STATE CURRENT WAVESHAPING IN A HARD DISK DRIVE (HDD) PREAMPLIFIER

(71) Applicant: LSI Corporation, San Jose, CA (US)

(72) Inventors: Boris Livshitz, Eagan, MN (US); Anamul Hoque, Lakeville, MN (US); Jason Goldberg, St. Paul, MN (US)

(73) Assignee: AVAGO TECHNOLOGIES GENERAL IP (SINGAPORE) PTE. LTD., Singapore (SG)

(*) Notice: Subject to any disclaimer, the term of this patent is extended or adjusted under 35 U.S.C. 154(b) by 0 days.

(21) Appl. No.: 13/771,882

(22) Filed: Feb. 20, 2013

(65) Prior Publication Data

US 2014/0226234 A1  Aug. 14, 2014

Related U.S. Application Data

(60) Provisional application No. 61/764,195, filed on Feb. 13, 2013.

(51) Int. Cl.
*G11B 5/02* (2006.01)
*G11B 5/012* (2006.01)
*G11B 5/09* (2006.01)

(52) U.S. Cl.
CPC *G11B 5/012* (2013.01); *G11B 5/02* (2013.01); *G11B 5/09* (2013.01)

(58) Field of Classification Search
CPC .............. G11B 5/02; G11B 5/17; G11B 5/09; G11B 20/10009; G11B 2005/001; G11B 2005/0018; G11B 20/10027; G11B 2005/0026

USPC ............ 360/46, 67, 68, 110, 123.01, 123.17, 360/123.18

See application file for complete search history.

(56) References Cited

U.S. PATENT DOCUMENTS

| | | | | |
|---|---|---|---|---|
| 8,654,471 | B2* | 2/2014 | Springberg et al. | 360/55 |
| 2003/0090828 | A1* | 5/2003 | Venca et al. | 360/61 |
| 2004/0196585 | A1* | 10/2004 | Choi et al. | 360/68 |
| 2005/0190476 | A1* | 9/2005 | Wilson et al. | 360/46 |
| 2007/0165320 | A1* | 7/2007 | Benakli et al. | 360/68 |
| 2008/0002267 | A1* | 1/2008 | Jang et al. | 360/46 |
| 2010/0238575 | A1* | 9/2010 | Gleason et al. | 360/31 |
| 2013/0128375 | A1* | 5/2013 | Livshitz et al. | 360/48 |

OTHER PUBLICATIONS

Livshitz et al. "Method for Analysis of On-Track and Off-Track Shielded Magnetic Write Head Recording Performance Based on Write Current Waveform Shaping", IEEE Transactions on Magnetics, vol. 48, No. 11, Nov. 2012, pp. 3911-3914.

* cited by examiner

*Primary Examiner* — Thomas Alunkal
(74) *Attorney, Agent, or Firm* — Hamilton DeSanctis & Cha

(57) ABSTRACT

Aspects of the disclosure pertain to a system and method for providing controllable steady state current waveshaping in a preamplifier of a data storage system (e.g., hard disk drive). The preamplifier provides an output including a write current waveform having a steady state current level that is controllable via the write block circuitry of the preamplifier. This enhances the ability of the waveform to promote improved on-track and off-track write performance.

20 Claims, 4 Drawing Sheets

SYSTEM AND METHOD FOR PROVIDING CONTROLLABLE STEADY STATE CURRENT WAVESHAPING IN A HARD DISK DRIVE (HDD) PREAMPLIFIER

CROSS-REFERENCE TO RELATED APPLICATIONS

This application claims priority to U.S. Provisional Application No. 61/764,195 filed on Feb. 13, 2013, entitled: "System and Method for Providing Controllable Steady State Current Waveshaping in a Hard Disk Drive (HDD) Preamplifier", which is hereby incorporated by reference in its entirety.

FIELD OF THE INVENTION

The present disclosure relates to the field of hard disk drive (HDD) and tape storage peripherals (e.g., controllers, preamplifiers (preamps), interfaces) and particularly to a system and method for providing controllable steady state current waveshaping in a HDD preamplifier.

BACKGROUND

Write current waveforms (e.g., write current waveshapes) are used in a preamplifier of a hard disk drive (HDD) to drive a write head which records data (e.g., bits of data, a data pattern) on a given track on a recording medium in the HDD. At high speeds, this write process in magnetic recording is challenging. For example, as data rates get faster and areal density increases, traditional (e.g., currently implemented) write current waveforms demonstrate degraded recording performance (e.g., degraded on-track and off-track recording performance). This degraded on-track performance is closely associated with track width modulation (e.g., track width widening) due to write head saturation and degraded bit-to-bit transitions. Further, with traditional write current waveforms, other problems that can occur are adjacent track erasure (ATE) and far track erasure (FTE), which affect off-track performance.

SUMMARY

This Summary is provided to introduce a selection of concepts in a simplified form that are further described below in the Detailed Description. This Summary is not intended to identify key and/or essential features of the claimed subject matter. Also, this Summary is not intended to limit the scope of the claimed subject matter in any manner Aspects of the disclosure pertain to a system and method for providing controllable steady state current waveshaping in a preamplifier of a data storage system.

DESCRIPTION OF THE FIGURES

The detailed description is described with reference to the accompanying figures.

WRITTEN DESCRIPTION

Aspects of the disclosure are described more fully hereinafter with reference to the accompanying drawings, which form a part hereof, and which show, by way of illustration, example features. The features can, however, be embodied in many different forms and should not be construed as limited to the combinations set forth herein; rather, these combinations are provided so that this disclosure will be thorough and complete, and will fully convey the scope. Among other things, the features of the disclosure can be facilitated by methods, devices, and/or embodied in articles of commerce. The following detailed description is, therefore, not to be taken in a limiting sense.

Figure 1:
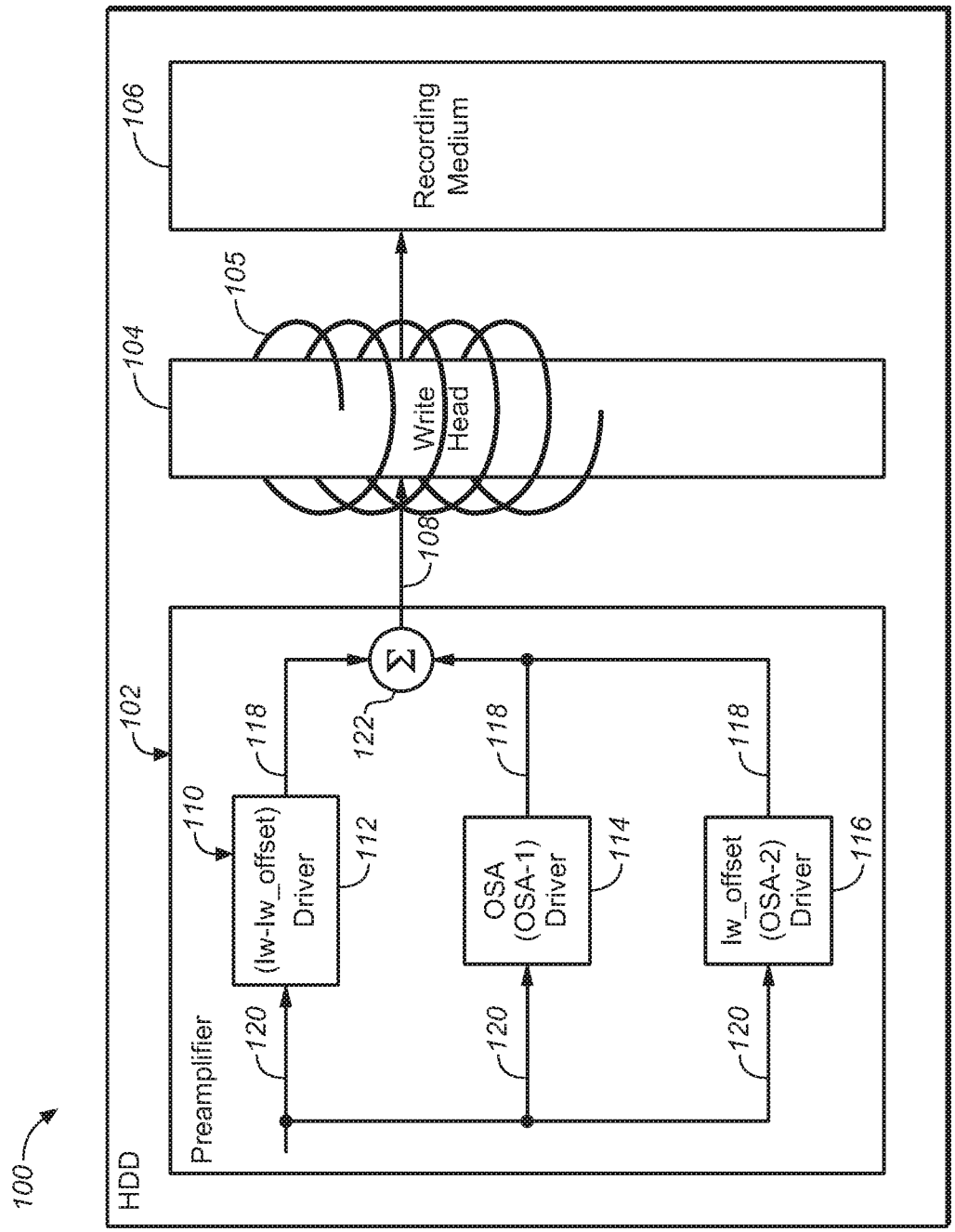
FIG. 1 is an example conceptual block diagram schematic of a data storage system (e.g., hard disk drive (HDD)) in accordance with an exemplary embodiment of the present disclosure.

Referring to FIG. 1 (FIG. 1), a data storage system 100 is shown. In embodiments, the data storage system is a hard disk drive (HDD) 100. For example, the HDD is a data storage device used for storing and retrieving digital information using rapidly rotating discs (e.g., platters) coated with magnetic material. In embodiments, the data storage system 100 includes a preamplifier (preamp) 102. For example, the preamplifier 102 is an electronic amplifier that prepares a small electrical signal for further amplification or processing.

In embodiments, the data storage system 100 further includes one or more coils (e.g., write coils) 105, a write head (e.g., disk write head) 104 and a recording medium 106. In embodiments, the write coils 105 are magnetically coupled with (e.g., wrapped around) the write head 104. In embodiments, the write coils 105 and write head 104 are connected to (e.g., operationally coupled with) the preamplifier 102 and the recording medium 106. In embodiments, the write head 104 is configured for writing (e.g., recording) data (e.g., bits of data, a data pattern) to the recording medium 106. For example, the write head 104 is a small part of the data storage system (e.g., HDD) 100, which moves above the recording medium (e.g., magnetic recording medium, disk platter). Further, the one or more coils (e.g., write coils) 105 are configured for causing magnetization of the write head 104. Magnetization of the write head 104 is controlled by an amplitude and direction of an electrical current produced in the coils 105. Magnetization of the write head affects switching of the bit in a magnetic data layer (e.g., recording medium).

In embodiments, the preamplifier 102 is configured for providing an output 108 to the write coils 105 and write head 104. In embodiments, the output 108 is configured for driving the write head 104. For example, the output 108 causes the write head to record (e.g., write) data to the recording medium 106. In embodiments, the output 108 includes a write current waveform (e.g., an output write current) and a data pattern to be recorded (e.g., written) to the recording medium 106.

In embodiments, the preamplifier 102 includes a circuit architecture responsible for the write process (e.g., write block, data path, write block circuitry) 110 which includes a plurality of circuit blocks. In embodiments, the circuit architecture 110 is configured for providing write current waveshaping (e.g., write pulse waveshaping). In embodiments, the circuit architecture 110 of the preamplifier 102 includes a steady state current level ($I_w$) block (e.g., steady state block, steady state current block) 112, a first overshoot (OS) block (e.g., a first current overshoot block) 114, and a second OS block (e.g., a second current overshoot block) 116. In embodiments, the circuit blocks (112, 114 and 116) are configured for providing outputs (e.g., signal outputs) 118 based upon received input(s) 120 (e.g., input(s) received or generated by the preamplifier 102). In embodiments, the circuit architecture 110 further includes a signal summer 122. In embodiments, the signal summer 122 is configured for combining (e.g., summing) the outputs 118 of the circuit blocks (112, 114 and 116) to generate the output 108 provided from the preamplifier 102 to the write head 104. In embodiments, it is contemplated that the preamplifier 102 further includes other architecture components (not shown) which are commonly included in preamplifiers, such as: a read block, a heater block and the like.

In embodiments, the first OS block 114 includes two major sub-blocks. In embodiments, the first sub-block of the first OS block 114 is a programmable pulse generation cell that sets OS duration (e.g., pulse width). In embodiments, the second sub-block of the first OS block 114 is an OS driver (e.g., an overshoot amplitude (OSA) driver; OSA-1) which supports overshoot amplitude (OSA), rise time and OS fall time. In embodiments, the range for the three time parameters (e.g., rise, duration and fall times) usually does not exceed the bit cell period.

In embodiments, the steady state current level block 112 has the same or similar settings to the first OS block 114 with the exception of duration, which may continue for a few bit cells. In embodiments, the duration of the steady state current level block 112 (e.g., steady state duration) is defined by the number of bits in the data pattern after a transition. In embodiments, the steady state current level block 112 is configured for matching the first OS block 114 to align rising edges of two signals.

In embodiments, the second OS block 116 is configured for providing similar control of OSA, rise time, OS duration (e.g., pulse width) and OS fall time as the first OS block 114. For example, the second OS block 116 includes two major sub-blocks: a programmable pulse generation cell that sets OS duration (e.g., pulse width); and an OS driver (e.g., an overshoot amplitude (OSA) driver; OSA-2) which supports overshoot amplitude (OSA), rise time and OS fall time. However, the second OS block 116 has hybrid properties, such that, in embodiments, the first OS block 114 is configured for supporting a first amplitude range and a first fall time, while the second OS block 116 is configured for supporting a second amplitude range and a second fall time, the second amplitude range being lower (e.g., much lower) than the first amplitude range, the second fall time being longer than the first fall time. In other embodiments, the second amplitude range may be equal to or higher than the first amplitude range. In embodiments, the second OS block 116 allows for robust profiling of the steady state interval. Further, the second OS block 116 provides additional control of write current waveshaping (e.g., write pulse waveshaping, write current pulse shaping).

Figure 2:
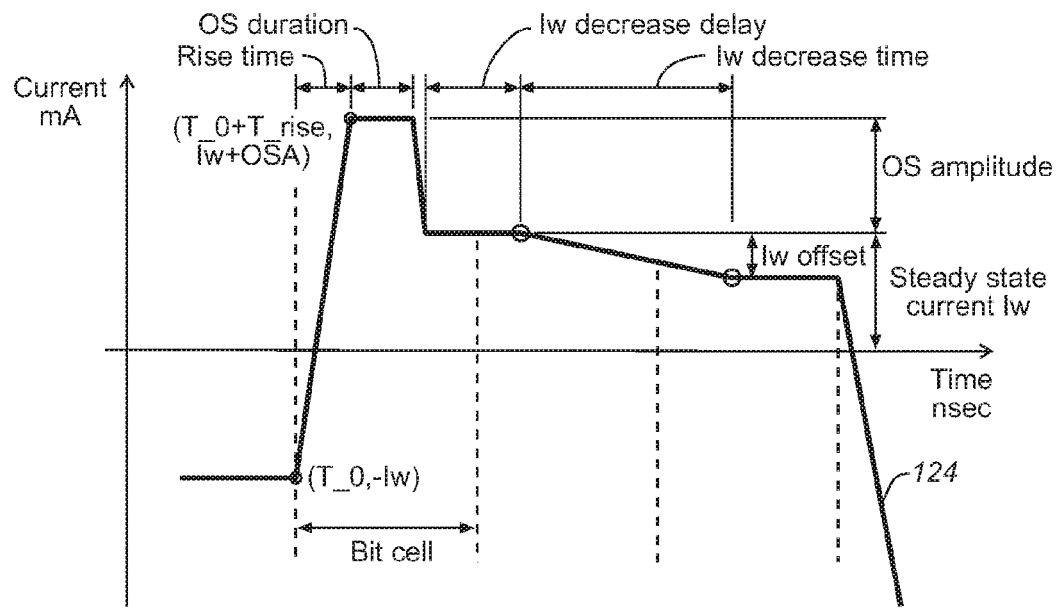
FIG. 2 is a depiction of a write current waveform which is supported by (e.g., may be implemented with) the data storage system shown in FIG. 1 in accordance with an exemplary embodiment of the present disclosure.

In embodiments, the above-described circuit architecture 110 of the preamplifier 102 supports steady state write current profiling. In embodiments, the above-described circuit architecture 110 of the preamplifier 102 supports implementation of the novel write current waveforms described herein, such as the write current waveform 124 shown in FIG. 2 (FIG. 2). In embodiments, the proposed waveform 124 is based on the following parameters: $I_w$ offset (e.g., setting a second low constant level at the end of a write current pulse); $I_w$ decrease delay (e.g., setting time interval between the end of overshoot (OS) and the start of $I_w$ decrease); and $I_w$ decrease time (e.g., setting time interval for write current decrease from $I_w$ to $I_w - I_w$ offset). As shown in FIG. 2, write current waveform 124 includes a steady state current plateau which is affected (e.g., updated) by a profile including two levels with a long transition between the two levels. This enhances the ability of the waveform 124 to promote improved on-track and off-track write performance in the following ways: by reducing track width modulation due to incomplete writer saturation for long bit length marks; by shortening transition times from the less saturated state of the writer (e.g., write head) 104 at the end of long bit length marks; by reducing the occurrence of adjacent track erasure (ATE) and far track erasure (FTE) due to stray fields from the less saturated write head's side shields or other structures generated during long bit length marks.

In embodiments, the write current waveform 124 has a controllable steady state current level ($I_w$) (e.g., a controllable $I_w$ profile) for promoting the provision of enhanced profiling of the steady state part of the write current waveform (e.g., a controllable profile for the part of the write current waveform after OS). In embodiments, this controllable steady state current level ($I_w$) (e.g., steady state write current profiling) is beneficial for magnetic recording for the case of long length marks. In embodiments, the improved off-track performance provided by the write current waveform is due to less active domain switching in a side shield of the write head 104 and the saturation of the write head 104 at a lower steady state current. In embodiments, implementation of write current waveform 124 promotes improved magnetic response during the write process. In embodiments, write current waveform 124 promotes reduced power consumption, which may promote HDD enhancement.

Figure 3:
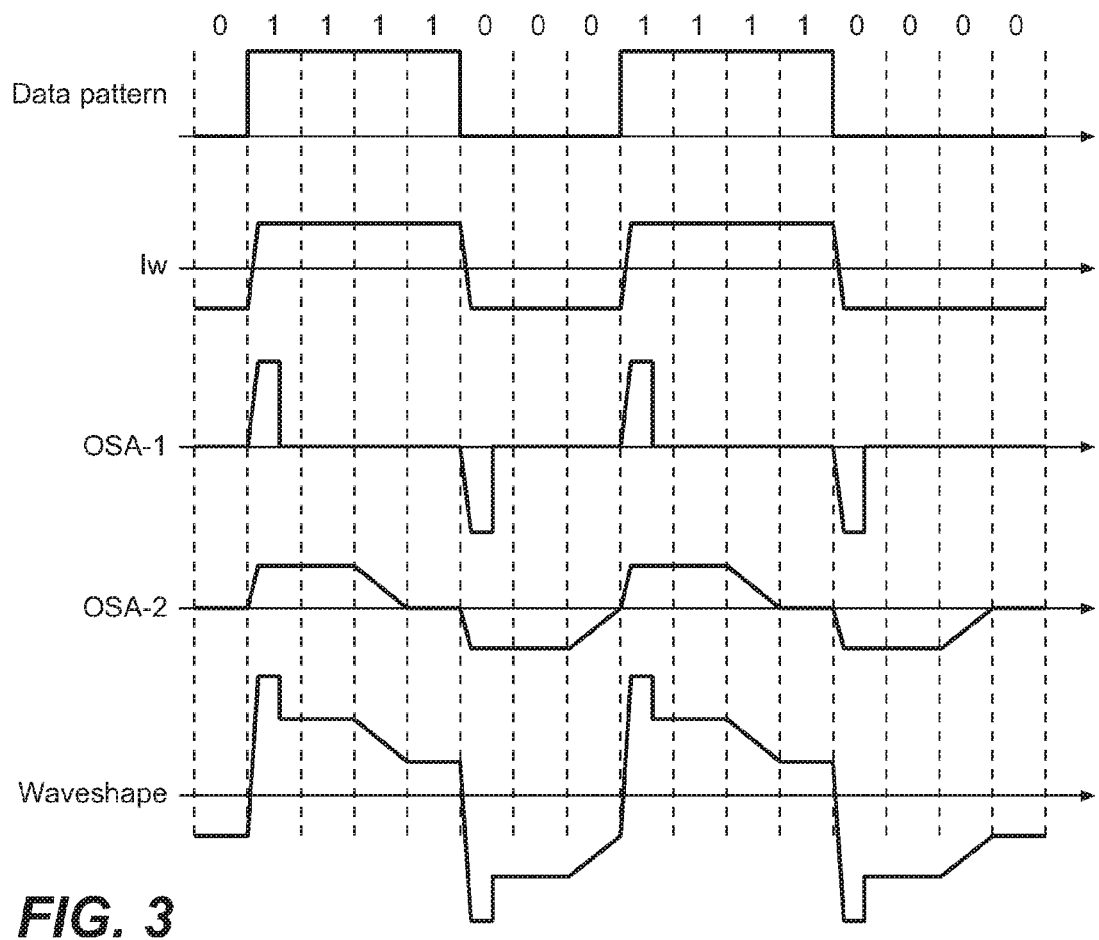
FIG. 3 depicts timing diagrams corresponding to signal outputs for the steady state current level block, the first OS block and the second OS block of the write block circuitry of the preamplifier, while also depicting timing diagrams corresponding to the data pattern to be recorded and the write current waveform, the data pattern and write current waveform being provided via an output from the preamplifier of the data storage system shown in FIG. 1 in accordance with an exemplary embodiment of the present disclosure.

As mentioned above, the circuit blocks (112, 114 and 116) are configured for providing outputs (e.g., signal outputs) 118 based upon received input(s) 120 (e.g., input(s) received or generated by the preamplifier 102). Further, the signal summer 122 is configured for combining (e.g., summing) the outputs 118 of the circuit blocks (112, 114 and 116) to generate the output 108 provided from the preamplifier 102 to the write head 104. Further, the output 108 includes a write current waveform (e.g., an output write current) and a data pattern to be recorded (e.g., written) to the recording medium 106. FIG. 3 (FIG. 3) depicts timing diagrams corresponding to signal outputs 118 for the steady state current level block 112 (e.g., $I_w$), the first OS block 114 (e.g., OSA-1) and the second OS block 116 (e.g., OSA-2), as well as depicting timing diagrams corresponding to the data pattern to be recorded and the write current waveform 124 being provided, the data pattern and write current waveform 124 being provided via the output 108 from the preamplifier 102.

Figure 4:
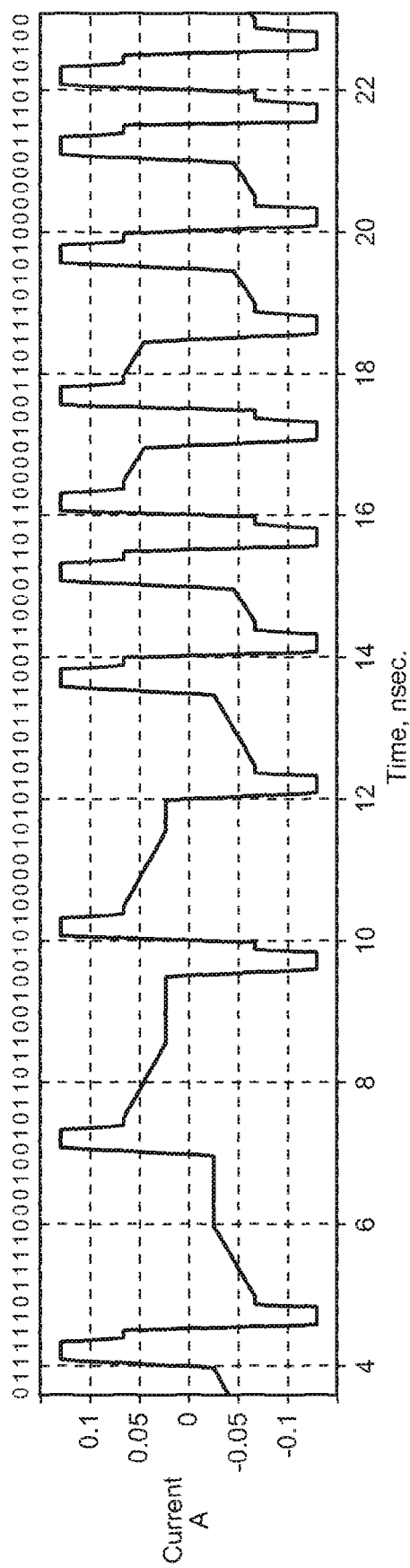
FIG. 4 depicts a write current waveform with a controllable steady state current level for a random data pattern in accordance with an exemplary embodiment of the present disclosure.

FIG. 4 (FIG. 4) depicts a write current waveform with a controllable steady state current level for a random data pattern in accordance with an exemplary embodiment of the present disclosure. The write current waveform depicted in FIG. 4 is supported by the write block circuitry 110 of system 100 described herein.

Figure 5:
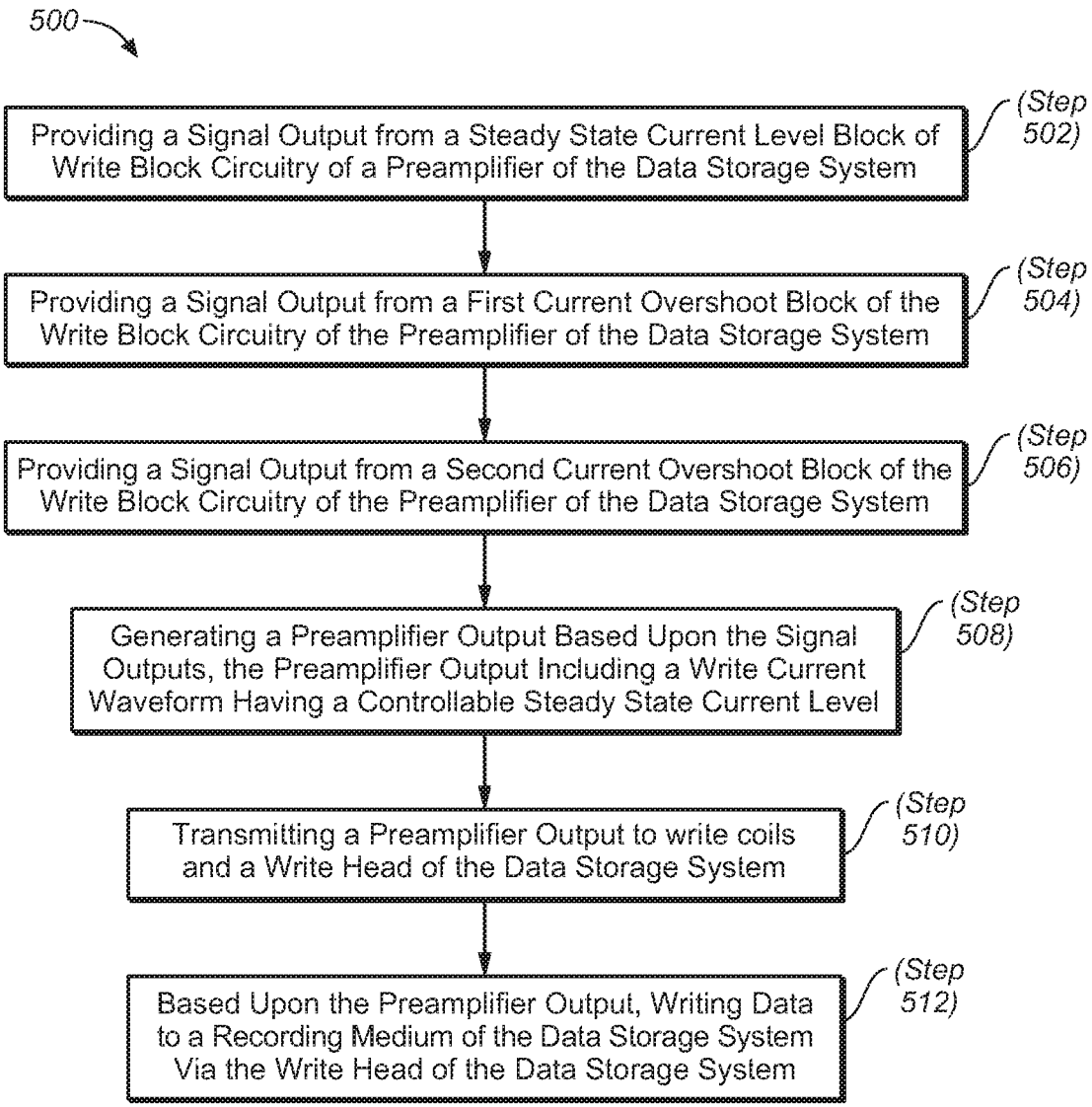
FIG. 5 is a flow chart illustrating a method for providing controllable steady state current waveshaping in a HDD preamplifier in accordance with an exemplary embodiment of the present disclosure.

FIG. 5 (FIG. 5) is a flow chart illustrating a method for providing controllable steady state current waveshaping in a preamplifier of a data storage system (e.g., a HDD) in accordance with an exemplary embodiment of the present disclosure. In embodiments, the method 500 includes providing a signal output from a steady state current level block of write block circuitry of a preamplifier of the data storage system (Step 502). In embodiments, the method 500 further includes providing a signal output from a first current overshoot block of the write block circuitry of the preamplifier of the data storage system (Step 504). In embodiments, the method 500 further includes providing a signal output from a second current overshoot block of the write block circuitry of the preamplifier of the data storage system (Step 506).

In embodiments, the method 500 further includes generating a preamplifier output based upon the signal outputs, the preamplifier output including a write current waveform having a controllable steady state current level (Step 508). In embodiments, the method 500 further includes transmitting the preamplifier output to a write head of the data storage system (Step 510). In embodiments, the method 500 further includes, based upon the preamplifier output, writing data to a recording medium of the data storage system via the write head of the data storage system (Step 512).

It is to be noted that the foregoing described embodiments may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the embodiments described herein may be conveniently implemented in forms of a software package. Such a software package may be a computer program product which employs a non-transitory computer-readable storage medium including stored computer code which is used to program a computer to perform the disclosed functions and processes disclosed herein. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A data storage system, comprising:
   a preamplifier, the preamplifier including write block circuitry, the write block circuitry including a steady state current level block, a first current overshoot block and a second current overshoot block, wherein the steady state current level block, the first current overshoot block and the second current overshoot block are configured for generating a plurality of signal outputs, the preamplifier configured for generating and transmitting an output derived from the plurality of signal outputs;
   write coils, the write coils being operationally coupled with the preamplifier;
   a write head, the write head being magnetically coupled with the write coils, the write coils configured for controlling magnetization of the write head, the write head being operationally coupled with the preamplifier, the write coils and write head configured for receiving the transmitted output from the preamplifier; and
   a recording medium, the recording medium being operationally coupled with the write head,
   wherein the write head is configured for writing data to the recording medium based upon the received preamplifier output, the preamplifier output including a write current waveform having a steady state current level that is controllable via the second current overshoot block.

2. The data storage system as claimed in claim 1, wherein the data storage system is a hard disk drive.

3. The data storage system as claimed in claim 1, wherein the write block circuitry includes a signal summer, the signal summer configured for combining the plurality of signal outputs to generate the preamplifier output.

4. The data storage system as claimed in claim 1, wherein the recording medium is a magnetic recording medium.

5. The data storage system as claimed in claim 1, wherein the second current overshoot block includes a programmable pulse generation cell for setting an overshoot duration.

6. The data storage system as claimed in claim 5, wherein the second current overshoot block includes an overshoot driver for supporting an overshoot amplitude rise time and an overshoot fall time.

7. The data storage system as claimed in claim 5, wherein the second current overshoot block is configured for supporting an amplitude range and a fall time.

8. The data storage system as claimed in claim 7, wherein the amplitude range supported by the second current overshoot block is lower than an amplitude range supported by the first current overshoot block.

9. The data storage system as claimed in claim 8, wherein the fall time supported by the second current overshoot block is of longer duration than the fall time supported by the first current overshoot block.

10. The data storage system as claimed in claim 9, wherein the steady state current level is based upon the following parameters: steady state current level offset; steady state current level decrease delay; and steady state current level decrease time.

11. A method for providing controllable steady state current waveshaping in a preamplifier of a data storage system, the method comprising:
   providing a signal output from a steady state current level block of write block circuitry of the preamplifier of the data storage system;
   providing a signal output from a first current overshoot block of the write block circuitry of the preamplifier of the data storage system;
   providing a signal output from a second current overshoot block of the write block circuitry of the preamplifier of the data storage system; and
   generating a preamplifier output based upon the signal outputs, the preamplifier output including a write current waveform having a controllable steady state current level.

12. The method as claimed in claim 11, further comprising:
   transmitting the preamplifier output to write coils and a write head of the data storage system.

13. The method as claimed in claim 12, further comprising:
   based upon the preamplifier output, writing data to a recording medium of the data storage system via the write head of the data storage system.

14. The method as claimed in claim 13, wherein the second current overshoot block is configured for supporting an amplitude range and a fall time.

15. The method as claimed in claim 14, wherein the amplitude range supported by the second current overshoot block is lower than an amplitude range supported by the first current overshoot block.

16. The method as claimed in claim 15, wherein the fall time supported by the second current overshoot block is of longer duration than the fall time supported by the first current overshoot block.

17. A hard disk drive, comprising:
a preamplifier, the preamplifier including write block circuitry, the write block circuitry including a steady state current level block, a first current overshoot block, a second current overshoot block and a signal summer, wherein the steady state current level block, the first current overshoot block and the second current overshoot block are configured for generating a plurality of signal outputs, the signal summer is configured for combining the plurality of signal outputs to generate a preamplifier output derived from the signal outputs, the preamplifier configured for transmitting the preamplifier output;
write coils, the write coils being operationally coupled with the preamplifier;
a write head, the write head being magnetically coupled with the write coils, the write coils configured for controlling magnetization of the write head, the write head being operationally coupled with the preamplifier, the write coils and write head configured for receiving the transmitted output from the preamplifier; and
a magnetic recording medium, the magnetic recording medium being operationally coupled with the write head,
wherein the write head is configured for writing data to the magnetic recording medium based upon the received preamplifier output, the preamplifier output including a write current waveform having a steady state current level that is controllable via the second current overshoot block.

18. The hard disk drive as claimed in claim 17, wherein the second current overshoot block includes: a programmable pulse generation cell for setting an overshoot duration; and an overshoot driver for supporting an overshoot amplitude rise time and an overshoot fall time.

19. The hard disk drive as claimed in claim 17, wherein the second current overshoot block is configured for supporting an amplitude range and a fall time.

20. The hard disk drive as claimed in claim 19, wherein: the amplitude range supported by the second current overshoot block is lower than an amplitude range supported by the first current overshoot block; and the fall time supported by the second current overshoot block is of longer duration than the fall time supported by the first current overshoot block.

* * * * *